United States Patent
Mutter et al.

(10) Patent No.: US 11,868,293 B2
(45) Date of Patent: Jan. 9, 2024

(54) DEVICE FOR A USER STATION OF A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 47 days.

(21) Appl. No.: 17/638,935

(22) PCT Filed: Aug. 24, 2020

(86) PCT No.: PCT/EP2020/073598
§ 371 (c)(1),
(2) Date: Feb. 28, 2022

(87) PCT Pub. No.: WO2021/047894
PCT Pub. Date: Mar. 18, 2021

(65) Prior Publication Data
US 2022/0292036 A1    Sep. 15, 2022

(30) Foreign Application Priority Data

Sep. 12, 2019 (DE) .................... 10 2019 213 926.4

(51) Int. Cl.
*G06F 13/40* (2006.01)
*G06F 13/42* (2006.01)
*G06F 13/376* (2006.01)

(52) U.S. Cl.
CPC ........ *G06F 13/376* (2013.01); *G06F 13/4022* (2013.01); *G06F 13/4282* (2013.01)

(58) Field of Classification Search
CPC . G06F 13/376; G06F 13/4022; G06F 13/4282
See application file for complete search history.

(56) References Cited

U.S. PATENT DOCUMENTS

2013/0304310 A1* 11/2013 Inada ................... B60W 30/16
                                                701/31.9
2014/0298133 A1* 10/2014 Hartwich ............. H03M 13/09
                                                714/758
(Continued)

FOREIGN PATENT DOCUMENTS

CN          108353012 A     7/2018
DE     102016224961 A1      6/2018
(Continued)

OTHER PUBLICATIONS

International Search Report for PCT/EP2020/073598, dated Nov. 19, 2020.

*Primary Examiner* — Henry Tsai
*Assistant Examiner* — Harry Z Wang
(74) *Attorney, Agent, or Firm* — NORTON ROSE FULBRIGHT US LLP; Gerard A. Messina

(57) ABSTRACT

A device for a serial bus system. The device includes a reception block for receiving a signal from a bus of the bus system. The signal is based on a transmission signal via which a message is exchanged between user stations. The reception block receives, in a first communication phase, the signal using a first reception threshold, and in a second communication phase, receives the signal using a second reception threshold. The device includes an evaluation block for evaluating the signal from the bus using a switchover reception threshold that differs from the first and second reception thresholds, and a reception threshold switching block for the time-limited switchover of the reception threshold of the reception block from the first reception threshold to the second reception threshold when the evaluation block detects the bus level for data of the transmission signal, using the switchover reception threshold in the signal.

13 Claims, 5 Drawing Sheets

(56) References Cited

U.S. PATENT DOCUMENTS

| | | | | |
|---|---|---|---|---|
| 2015/0222455 A1* | 8/2015 | Ohtsuka | ............. | H04L 25/0272 |
| | | | | 375/219 |
| 2018/0041361 A1* | 2/2018 | Kishigami | ........ | H04L 12/40045 |
| 2019/0272248 A1* | 9/2019 | Metzner | .............. | G06F 13/4022 |
| 2019/0288870 A1* | 9/2019 | de Haas | ............ | H04L 12/40032 |
| 2020/0382340 A1* | 12/2020 | Muth | ................ | H04L 12/40013 |

FOREIGN PATENT DOCUMENTS

| | | |
|---|---|---|
| DE | 102018202167 A1 | 6/2019 |
| DE | 102018202170 A1 | 6/2019 |
| EP | 19177401.7 * | 5/2019 |
| JP | 2017079403 A | 4/2017 |

\* cited by examiner

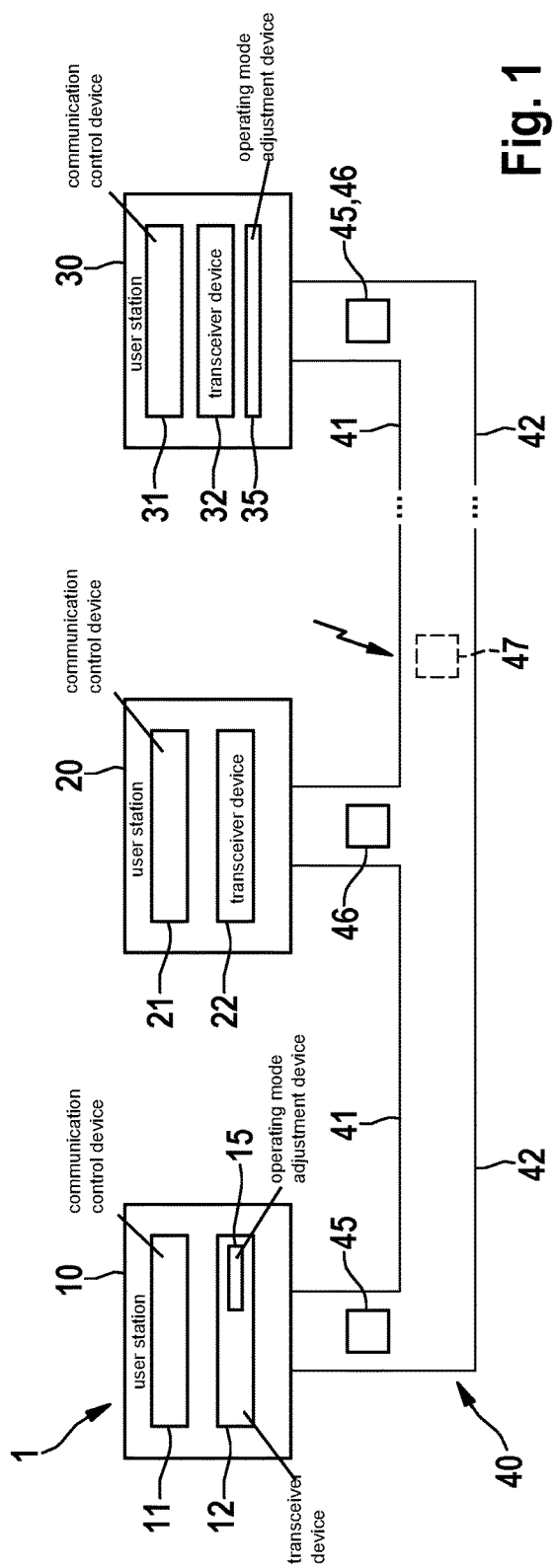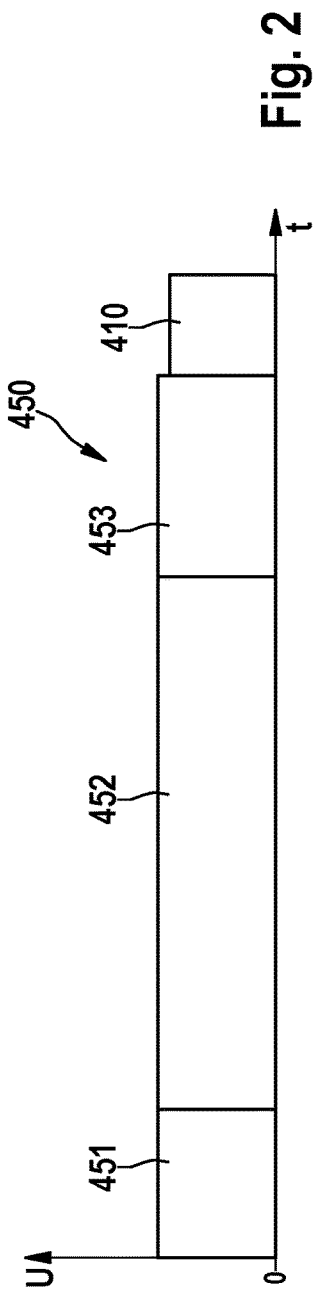

DEVICE FOR A USER STATION OF A SERIAL BUS SYSTEM, AND METHOD FOR COMMUNICATING IN A SERIAL BUS SYSTEM

FIELD

The present invention relates to a device for a user station of a serial bus system, and a method for communicating in a serial bus system that operates at a high data rate and a high level of error robustness.

BACKGROUND INFORMATION

For the communication between sensors and control units, for example in vehicles, a bus system is frequently used in which data are transferred as messages under the ISO 11898-1:2015 standard, as a CAN protocol specification with CAN FD. The messages are transferred between the bus users of the bus system, such as the sensor, control unit, transducer, etc.

To allow data to be transferred at a higher bit rate than with CAN, an option has been provided in the CAN FD message format for switching over to a higher bit rate within a message. In such technologies, the maximum possible data rate is increased beyond a value of 1 Mbit/s by using higher clocking in the area of the data fields. Such messages are also referred to below as CAN FD frames or CAN FD messages.

At the present time, devices for communication using CAN FD are in the introduction phase for vehicles. With most manufacturers, CAN FD is used in the vehicle at a 2 Mbit/s data bit rate and a 500 kbit/s arbitration bit rate in the first step. In addition, with CAN FD the useful data length of 8 bytes is increased up to 64 bytes, and the data transfer rates are much higher than with CAN.

For an even higher data bit rate and useful data length in a message, at the present time a successor bus system for CAN FD (referred to below as CAN XL) is being developed. In addition to strict data transport, CAN XL is intended to also support other functions via the CAN bus, such as functional safety, data security, and quality of service (QoS). These are basic properties that are required in an autonomously traveling vehicle.

CAN XL is also intended to offer the advantages of the arbitration of a CAN- or CAN FD-based communications network, according to which in the data phase only one user station has exclusive, collision-free access to the bus of the bus system. This provides a very large number of advantages, for example with regard to the error robustness of the communication. For the arbitration, there are recessive bus levels and dominant bus levels on the bus, the dominant bus level being able to overwrite a recessive bus level. Since the recessive and dominant bus levels are driven at different intensities, the bus levels on the bus deform asymmetrically. As a result, for a robust data transfer the recessive and dominant bus levels are usable only up to a certain rapidity of the data transfer. Thus, with CAN XL, if the data bit rate is intended to be greater or higher, i.e., faster, than with CAN FD, there are no longer recessive and dominant bus levels with CAN XL in the data phase. Instead, other bus levels, referred to below as data_0 and data_1, are used in the data phase. Thus, for a transceiver device, with CAN XL the operating mode for generating the bus levels in the arbitration phase and the operating mode for generating the bus levels in the data phase are also different.

For the transceiver device in the CAN XL data phase, this has the significant disadvantage that a first transceiver device of the bus system that is switched into the data phase operating mode is not able to reliably detect the levels of a second transceiver device of the bus system that is switched into the arbitration phase operating mode. In addition, the second transceiver device of the bus system that is switched into the arbitration phase operating mode also cannot reliably detect the levels of the first transceiver device that is switched into the data phase operating mode.

During normal communication, when all user stations of the bus system switch over their transceiver device at the same time, apart from propagation times over the bus, no problem occurs. However, if a user station of the bus system is switched on while the other user stations are transmitting at least one CAN XL frame, the user station to be newly added cannot unequivocally detect an idle state at the end of a frame. Therefore, such a user station cannot be properly integrated. The same applies for a user station that is switched into a protocol exception state according to ISO 11898-1:2015 in order to tolerate a transfer of a frame in the bus system for which the user station is not designed. Furthermore, the same applies for a user station that has lost the connection due to bit error. This results in errors in the communication, and thus, reduction of the transferable net data rate.

SUMMARY

An object of the present invention is to provide a device for a user station of a serial bus system, and a method for communicating in a serial bus system, which solve the above-mentioned problems. In particular, an object of the invention is to provide a device for a user station of a serial bus system, and a method for communicating in a serial bus system in which a high data rate and an increase in the quantity of the useful data per frame may be achieved with great flexibility during operation of a technical facility in which the bus system is used for communication, and with a high level of error robustness of the communication.

The object may be achieved by a device for a user station of a serial bus system in accordance with the present invention. In accordance with an example embodiment of the present invention, the device includes a reception block for receiving a signal from a bus of the bus system, the signal being based on a transmission signal via which a message is exchanged between user stations of the bus system, and the reception block being designed, in a first communication phase in which in the signal a recessive bus state is overwritable by a dominant bus state, to receive the signal using a first reception threshold, and in a second communication phase in which bus states other than the recessive and dominant bus states are present in the signal, to receive the signal using a second reception threshold; an evaluation block for evaluating the signal from the bus of the bus system using a switchover reception threshold that differs from the first reception threshold and the second reception threshold; and a reception threshold switching block for the time-limited switchover of the reception threshold of the reception block from the first reception threshold to the second reception threshold when the evaluation block detects the bus level for data_1 of the transmission signal, using the switchover reception threshold in the signal.

Due to the design of the device, a user station of the bus system that is switched on while the other user stations are transmitting CAN XL frames may be automatically integrated into an ongoing communication. The device may unequivocally detect the idle state, so that the user station is properly integratable into the communication without problems. The device may automatically switch the user station into the operating mode that is correct for the operating state that is presently on the bus. In this way, the user station may correctly detect the instantaneous bus level.

An advantage of the described device in accordance with an example embodiment of the present invention is that a transceiver device of the user station automatically adapts to the correct reception threshold based on an easily detectable switchover condition, which requires little outlay of hardware.

The described device in accordance with an example embodiment of the present invention offers the same advantages for user stations that are switched into the protocol exception state according to ISO 11898-1:2015, or that have lost the connection due to bit error.

It is thus possible, without loss of the robustness of the bus system, to actively drive the two bus states in a frame in the data phase. The device thus contributes significantly to being able to increase the net data rate in the bus system.

The described device in accordance with an example embodiment of the present invention thus prevents the user station of the bus system from interfering with or interrupting the transmission of any other arbitrary user station, via an error frame, solely because the integration into the ongoing communication has failed.

As a result, by use of the device in accordance with an example embodiment of the present invention, which in particular is a reception block or a transceiver device, reception of the frames may be ensured with a low error rate, even with an increased volume of useful data per frame. It may thus be communicated in the serial bus system when a high data rate and an increase in the volume of the useful data per frame occur, also with a high level of error robustness.

By use of the device in accordance with an example embodiment of the present invention in the bus system, it is thus possible in particular to maintain an arbitration from CAN in a first communication phase and still increase the transfer rate considerably compared to CAN or CAN FD.

This contributes toward achieving a net data rate from at least 5 Mbit/s to approximately 8 Mbit/s or 10 Mbit/s or higher. In the case of a transfer speed of 10 Mbit/s, the length of a bit is less than 100 ns. In addition, the quantity of the useful data may be up to 4096 bytes per frame.

The method carried out by the device may also be used when at least one CAN FD-tolerant CAN user station that is designed according to the ISO 11898-1:2015 standard and/or at least one CAN FD user station that transmit(s) messages according to the CAN protocol and/or CAN FD protocol are/is also present in the bus system.

Advantageous further embodiments of the device of the present invention are disclosed herein.

According to one exemplary embodiment of the present invention, the reception threshold switching block is designed, for the time-limited switchover of the reception threshold of the reception block from the first reception threshold to the second reception threshold, to switch the reception block into an operating mode that differs from three other operating modes of the device, the three other operating modes of the device including: a first operating mode for transmitting and/or receiving the signal in the first communication phase, a second operating mode only for receiving the signal in the second communication phase, and a third operating mode for transmitting and receiving the signal in the second communication phase.

According to one exemplary embodiment of the present invention, the reception threshold switching block is designed to make the time-limited switchover of the reception threshold of the reception block from the first reception threshold to the second reception threshold in a first operating mode in which the reception of the signal is carried out in the first communication phase.

It is possible for the evaluation block to be a comparator that includes an input for connection to two bus lines of the bus, and whose output is connected to the reception threshold switching block.

The evaluation block is possibly designed to check whether the switchover reception threshold is undershot by a bus level for data_1 of the transmission signal in the signal. The switchover reception threshold may be a reception threshold having a negative numerical value.

According to one particular embodiment variant of the present invention, the bus states of the signal received from the bus in the first communication phase are generated with a different physical layer than the bus states of the signal received in the second communication phase.

According to a further particular embodiment variant of the present invention, the bus states of the signal received from the bus in the first communication phase have a longer bit time than the bus states of the signal received in the second communication phase.

In the first communication phase, it is possibly negotiated which of the user stations of the bus system in the subsequent second communication phase obtains, at least temporarily, exclusive, collision-free access to the bus.

The device may also include a transmission block for transmitting messages onto a bus of the bus system, the transmission block, when transmitting the various communication phases of a message, being designed to switch between a transmission operating mode for the first communication phase, and a transmission operating mode for the second communication phase.

The device described above may be part of a user station for a serial bus system which also includes a communication control device for controlling a communication of the user station with at least one other user station of the bus system.

There is an option for the communication control device to be designed to switch the device into an operating mode for transmitting and/or receiving the signal in the first communication phase when the communication control device has detected an idle state on the bus.

The user station described above may be part of a bus system which also includes a bus and at least two user stations that are connected to one another via the bus in such a way that they may communicate serially with one another. At least one of the at least two user stations is a user station described above.

Moreover, the object stated above is achieved by a method for communicating in a serial bus system according to the present invention. In accordance with an example embodiment of the present invention, the method is carried out using a device that includes a reception block for receiving a signal from a bus of the bus system, an evaluation block, and a reception threshold switching block, the device carrying out the steps: receiving via the reception block a signal from the bus that is based on a transmission signal via which a message is exchanged between user stations of the bus system, the reception block being designed, in a first communication phase in which in the signal a recessive bus state is overwritable by a dominant bus state, to receive the signal using a first reception threshold, and in a second communication phase in which bus states other than the recessive and dominant bus states are present in the signal, to receive the signal using a second reception threshold; evaluating, using the evaluation block, the signal from the bus of the bus system using a switchover reception threshold that differs from the first reception threshold and the second reception threshold; and, using the reception threshold switching block, switching over in a time-limited manner the reception threshold of the reception block from the first reception threshold to the second reception threshold when the evaluation block, using the switchover reception threshold, detects in the signal the bus level for data_1 of the transmission signal.

The method yields the same advantages as stated above with regard to the device and/or the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

FIG. 1 shows a simplified block diagram of a bus system according to a first exemplary embodiment of the present invention.

FIG. 2 shows a diagram for illustrating the design of messages that may be transmitted from a transceiver device for a user station of the bus system according to the first exemplary embodiment of the present invention.

Unless stated otherwise, identical or functionally equivalent elements are provided with the same reference numerals in the figures.

DETAILED DESCRIPTION OF EXAMPLE EMBODIMENTS

Figure 3:
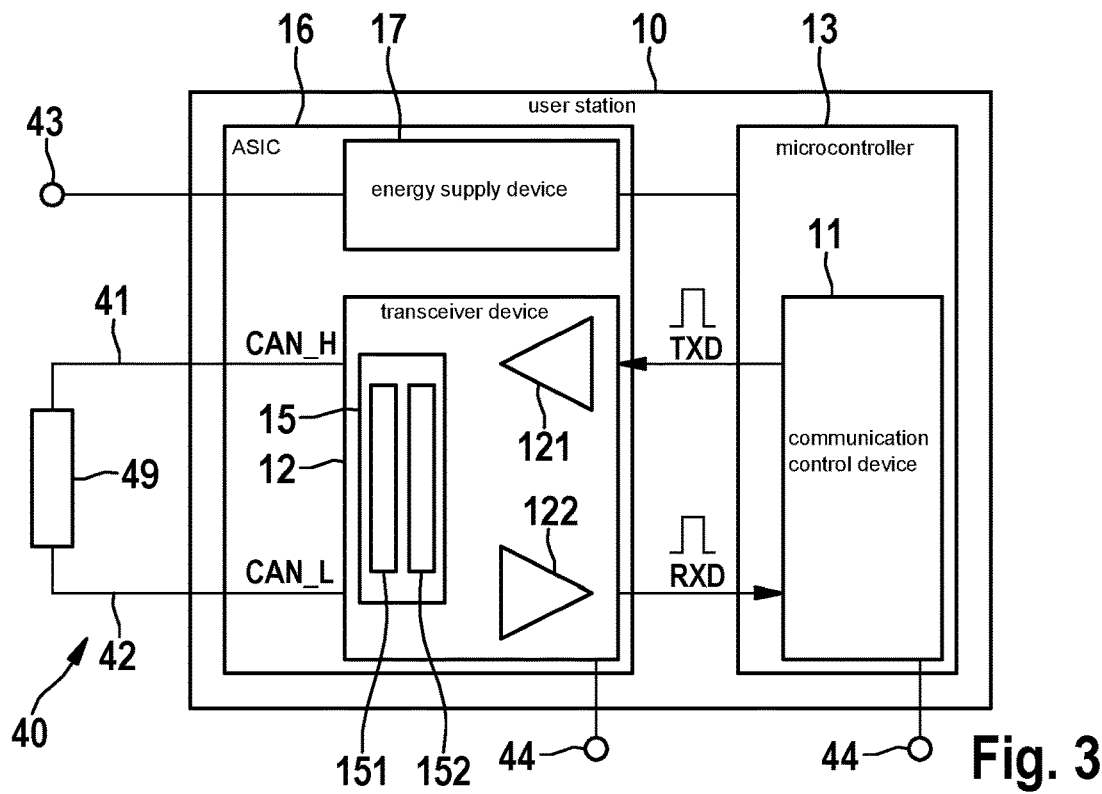
FIG. 3 shows a simplified schematic block diagram of a user station of the bus system according to the first exemplary embodiment of the present invention.

FIG. 1 shows as an example a bus system 1 that is in particular the basis for the design of a CAN bus system, a CAN FD bus system, a CAN XL bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L or CAN XL_H and CAN XL_L, and are used for electrical signal transfer after coupling in the difference levels or dominant levels or generating recessive levels for a signal in the transmission state.

Messages 45, 46 in the form of signals are serially transferable between individual user stations 10, 20, 30 via bus 40. User stations 10, 20, 30 are, for example, control units, sensors, display devices, etc., of a motor vehicle.

If an error occurs during the communication on bus 40, as illustrated by the serrated dark block arrow in FIG. 1, an error frame 47 (error flag) may be transmitted. Error frame 47 is made up of six dominant bits. All other user stations 10, 20, 30 detect these six successive dominant bits as a format error or as a violation of the bit stuffing rule, which prescribes that in a message 45, 46, after five identical bits a bit inverse thereto must be inserted.

An error-free message 45, 46 is confirmed by the receivers via an acknowledge bit, which is a dominant bit that is driven in an "acknowledge" time slot that is transmitted recessively by the sender. Up to the "acknowledge" time slot, the sender of a message 45, 46 expects to always see on bus 40 the level that the sender itself transmits. Otherwise, the sender detects a bit error and regards message 45, 46 as invalid. Unsuccessful messages 45, 46 are repeated.

As shown in FIG. 1, user station 10 includes a communication control device 11, a transceiver device 12, and an operating mode adjustment device 15. In contrast, user station 20 includes a communication control device 21 and a transceiver device 22. User station 30 includes a communication control device 31, a transceiver device 32, and an operating mode adjustment device 35. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control device 11 creates and reads first messages 45, which are modified CAN messages 45, for example. Modified CAN messages 45 are built up based on a CAN XL format, described in greater detail with reference to FIG. 2.

Communication control device 21 may be designed as a conventional CAN controller according to ISO 11898-1: 2015. Communication control device 21 creates and reads second messages 46, for example conventional CAN messages 46. Conventional CAN messages 46 are built up according to the conventional base format, in which a number of up to 8 data bytes may be included in message 46. Alternatively, conventional CAN message 46 is built up as a CAN FD message, in which a number of up to 64 data bytes, which are also transferred at a much faster data rate than with conventional CAN message 46, may be included.

In the latter case, communication control device 21 is designed as a conventional CAN FD controller.

Communication control device 31 may be designed to provide a CAN XL message 45 or a conventional CAN message 46 for transceiver device 32 or receive it from same, as needed. Communication control device 31 thus creates and reads a first message 45 or second message 46, first and second messages 45, 46 differing by their data transmission standard, namely, CAN XL or CAN in this case. Alternatively, conventional CAN message 46 is built up as a CAN FD message. In the latter case, communication control device 31 is designed as a conventional CAN FD controller.

Except for the differences described in greater detail below, transceiver device 12 may be designed as a CAN XL transceiver. Transceiver device 22 may be designed as a conventional CAN transceiver or as a CAN FD transceiver. Transceiver device 32 may be designed to provide messages 45 according to the CAN XL format or messages 46 according to the present CAN base format for communication control device 31 or receive the messages from same, as needed. Additionally or alternatively, transceivers 12, 32 may be designed as a conventional CAN FD transceiver.

A formation and then transfer of messages 45 having the CAN XL format, in addition to the reception of such messages 45, is achievable by use of the two user stations 10, 30.

FIG. 2 shows for message 45 a CAN XL frame 450, which is transmitted from transceiver device 12 or transceiver device 32. For the CAN communication on bus 40, CAN XL frame 450 is divided into different communication phases 451 through 453, namely, an arbitration phase 451, a data phase 452, and a frame end phase 453. An idle or standby state 410 may occur on bus 40 between two different frames 450, in which none of user stations 10, 20, 30 transmits something onto bus 40. Idle or standby 410 is referred to below as "idle state 410" for short.

In arbitration phase 451, with the aid of an identifier, bit-by-bit negotiation is carried out between user stations 10, 20, 30 concerning which user station 10, 20, 30 would like to transmit message 45, 46 having the highest priority, and therefore for the next time period for transmitting in subsequent data phase 452 obtains exclusive access to bus 40 of bus system 1.

The useful data of the CAN XL frame or of message 45 are transmitted in data phase 452. The useful data may include up to 4096 bytes, for example, or a greater value, corresponding to the value range of a data length code. In data phase 452, during normal operation only one of user stations 10, 20, 30 is the sender of a frame 450, as described above. Thus, all other user stations 10, 20, 30 are receivers of frame 450 and are therefore switched into a reception operating mode.

In frame end phase 453, a check sum of the data of data phase 452 may be contained in a check sum field, for example, including the stuff bits that are inserted as an inverse bit by the transmission block of message 45 in each case after a predetermined number of identical bits, in particular 10, or some other number of, identical bits. In addition, in frame end phase 453 at least one acknowledge bit may be contained in an end field. Furthermore, a sequence of 11 identical bits that indicate the end of CAN XL frame 450 may be present. By use of the at least one acknowledge bit, it may be communicated whether or not a reception block has found an error in received CAN XL frame 450 or message 45, as mentioned above.

A physical layer, similarly as with CAN and CAN FD, is used in arbitration phase 451 and frame end phase 453. The physical layer corresponds to the bit transfer layer or layer one of the conventional Open Systems Interconnection (OSI) model.

An important point during phases 451, 453 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

A transmission block of message 45 starts a transmission of bits of data phase 452 onto bus 40 only after user station 10, as the transmission block, has won the arbitration, and user station 10, as the transmission block, thus has exclusive access to bus 40 of bus system 1 for the transmission.

In general, in the bus system with CAN XL, in comparison to CAN or CAN FD the following differing properties may be achieved:

a) acquiring and optionally adapting proven properties that are responsible for the robustness and user-friendliness of CAN and CAN FD, in particular a frame structure including identifiers and arbitration according to the CSMA/CR method,
b) increasing the net data transfer rate to approximately 10 megabits per second,
c) increasing the quantity of the useful data per frame to approximately 4 kbytes.

FIG. 3 shows the basic design of user station 10 together with communication control device 11, transceiver device 12, and operating mode adjustment device 15. Operating mode adjustment device 15 includes an evaluation block 151 and a reception threshold switching block 152.

User station 30 has a design similar to that shown in FIG. 3, except that operating mode adjustment device 35 is not integrated into transceiver device 32, but, rather, provided separately from communication control device 31 and transceiver device 32. Therefore, user station 30 and operating mode adjustment device 35 are not separately described. The functions of device 15 described below are present in an identical form for device 35.

According to FIG. 3, in addition to communication control device 11, transceiver device 12, and device 15, user station 10 includes a microcontroller 13 with which communication control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN_Supply of 5 V. However, energy supply device 17 may supply some other voltage having a different value, as needed. Additionally or alternatively, energy supply device 17 may be designed as a power source.

Transceiver device 12 also includes a transmission block 121 and a reception block 122. Even though transceiver device 12 is consistently referred to below, it is alternatively possible to provide reception block 122 in a separate device externally from transmission block 121. Transmission block 121 and reception block 122 may be designed as a conventional transceiver device 22. Transmission block 121 may in particular include at least one operational amplifier and/or one transistor. Reception block 122 may in particular include at least one operational amplifier and/or one transistor.

Transceiver device 12 is connected to bus 40, or more precisely, to its first bus wire 41 for CAN_H or CAN XL_H and its second bus wire 42 for CAN_L or CAN XL_L. The supplying of voltage for energy supply device 17 for supplying first and second bus wires 41, 42 with electrical energy, in particular with voltage CAN_Supply, takes place via at least one terminal 43. The connection to ground or CAN_GND is achieved via a terminal 44. First and second bus wires 41, 42 are terminated via a terminating resistor 49.

In transceiver device 12, first and second bus wires 41, 42 are not just connected to transmission block 121, also referred to as a transmitter, and to reception block 122, also referred to as a receiver, even though the connection in FIG. 3 is not shown for simplification. In transceiver device 12, first and second bus wires 41, 42 are also connected to device 15.

Figure 4:
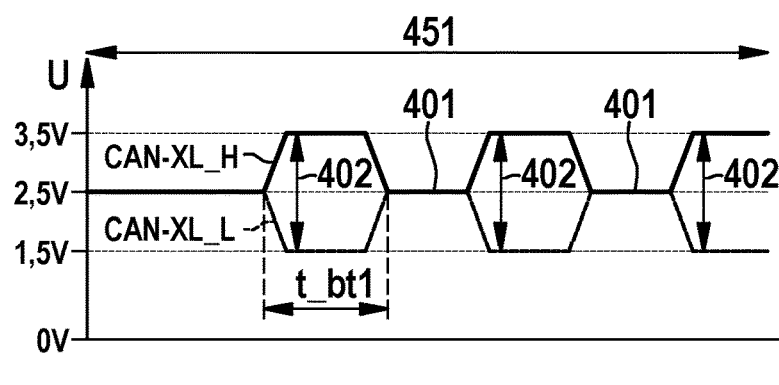
FIG. 4 shows a temporal profile of bus signals CAN XL_H and CAN XL_L in the arbitration phase on a bus of the bus system according to the first exemplary embodiment of the present invention.

During operation of bus system 1, transmission block 121 may convert during the transmission operation of transceiver device 12 a transmission signal TXD or TxD of communication control device 11 having digital states 0 and 1, as schematically illustrated in FIG. 3, into corresponding signals data_0 and data_1 for bus wires 41, 42, and may transmit these signals data_0 and data_1 onto bus 40 at the terminals for CAN_H and CAN_L or CAN XL_H and CAN XL_L, as shown in FIG. 4.

Figure 5:
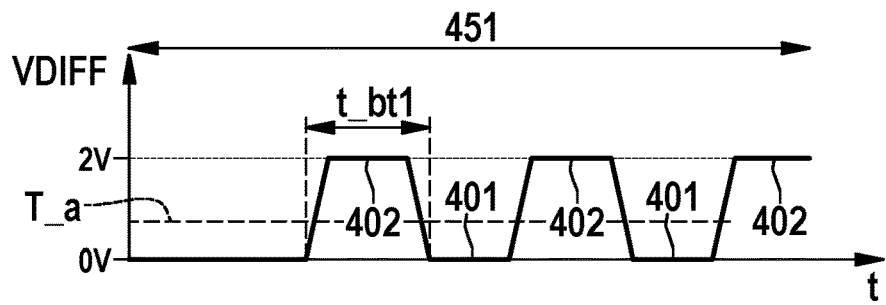
FIG. 5 shows a temporal profile of a differential voltage VDIFF that results from bus signals CAN XL_H and CAN XL_L from FIG. 4.

According to FIG. 5, reception block 122 forms a differential voltage VDIFF from bus signals on CAN XL_H and CAN XL_L that are received from bus 40, converts it into a reception signal RXD or RxD having digital states 0 and 1, as schematically illustrated in FIG. 3, and passes it on to communication control device 11, as shown in FIG. 3. With the exception of idle state 410, transceiver device 12 with reception block 122 during normal operation always listens to a transfer of data or messages 45, 46 on bus 40, in particular regardless of whether or not transceiver device 12 is the sender of message 45.

According to FIG. 4, the signals on CAN XL_H and CAN XL_L in above-mentioned communication phases 451, 453 include dominant and recessive bus levels 401, 402, as from CAN. In contrast, signals CAN XL_H and CAN XL_L in data phase 452 differ from conventional signals CAN_H and CAN_L, as described in greater detail below with reference to FIG. 6. A difference signal VDIFF=CAN XL_H−CAN XL_L, shown in FIG. 5, is formed on bus 40 due to signals CAN XL_H and CAN XL_L from FIG. 4. The bits of difference signal VDIFF have a bit time duration t_bt1.

As is discernible from FIG. 4, transmission block 121 drives dominant states 402 of differential signals CAN XL_H, CAN XL_L differently only in above-mentioned communication phases 451, 453. The bus levels on bus 40 for recessive states 401 in above-mentioned communication phases 451, 453 are equal to one-half of voltage Vcc or CAN_Supply of approximately 5 V, for example, i.e., 2.5 V. In recessive state 401, the bus level is not driven by transmission block 121, but instead is set by terminating resistor 49. In contrast, the bus levels on bus 40 for dominant states 402 are approximately 1.5 V for signal CAN XL_L and 3.5 V for signal CAN XL_H. Accordingly, in the example from FIGS. 4 and 5 a differential voltage VDIFF between approximately 0 V and 2 V results. Thus, a value of approximately 0 V results for a voltage VDIFF=CAN XL_H−CAN XL_L for recessive states 401 (logical "1" of transmission signal TxD), and a value of approximately 2.0 V results for dominant states 402 (logical "0" of transmission signal TxD). Reception block 122 in phases 451, 453 may detect the state change between states 401, 402 with the aid of a reception threshold T_a, as shown in FIG. 5. In the example from FIG. 5, a reception threshold T_a of reception block 122 is set at approximately 0.7 V. In a customary transceiver module or a module of a transceiver device 12, the reception threshold is in a tolerance range between T_a_min and T_a_max, depending on the operating temperature, operating voltage, and manufacturing tolerance.

Figure 6:
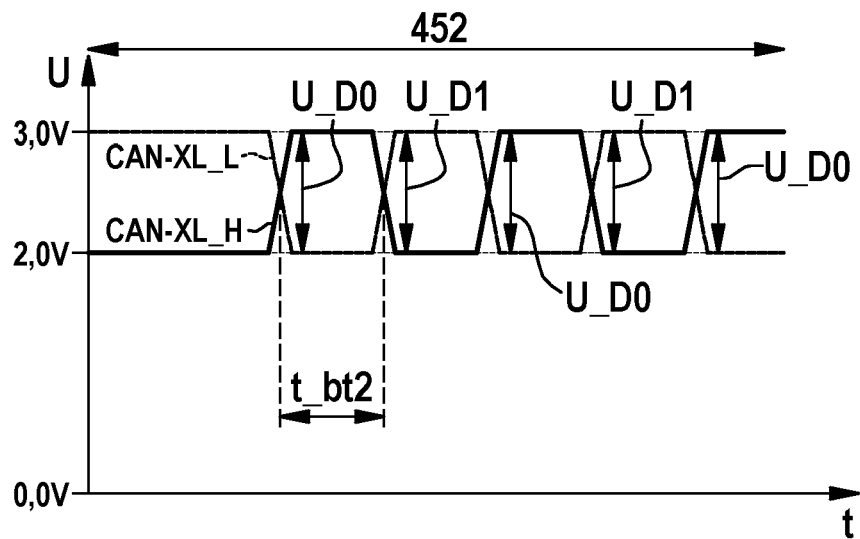
FIG. 6 shows a temporal profile of bus signals CAN XL_H and CAN XL_L in the data phase on a bus of the bus system according to the first exemplary embodiment of the present invention.
Figure 7:
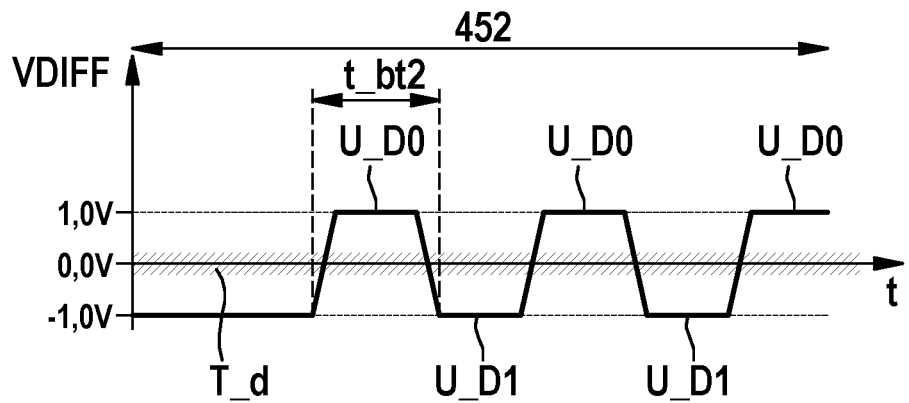
FIG. 7 shows a temporal profile of a differential voltage VDIFF that results from bus signals CAN XL_H and CAN XL_L from FIG. 6.

FIGS. 6 and 7 show temporal profiles comparable to FIGS. 4 and 5 for data phase 452. Consequently, transmission block 121 in data phase 452 drives bus states U_D0, U_D1 of differential signals CAN XL_H, CAN XL_L differently in each case.

Figure 8:
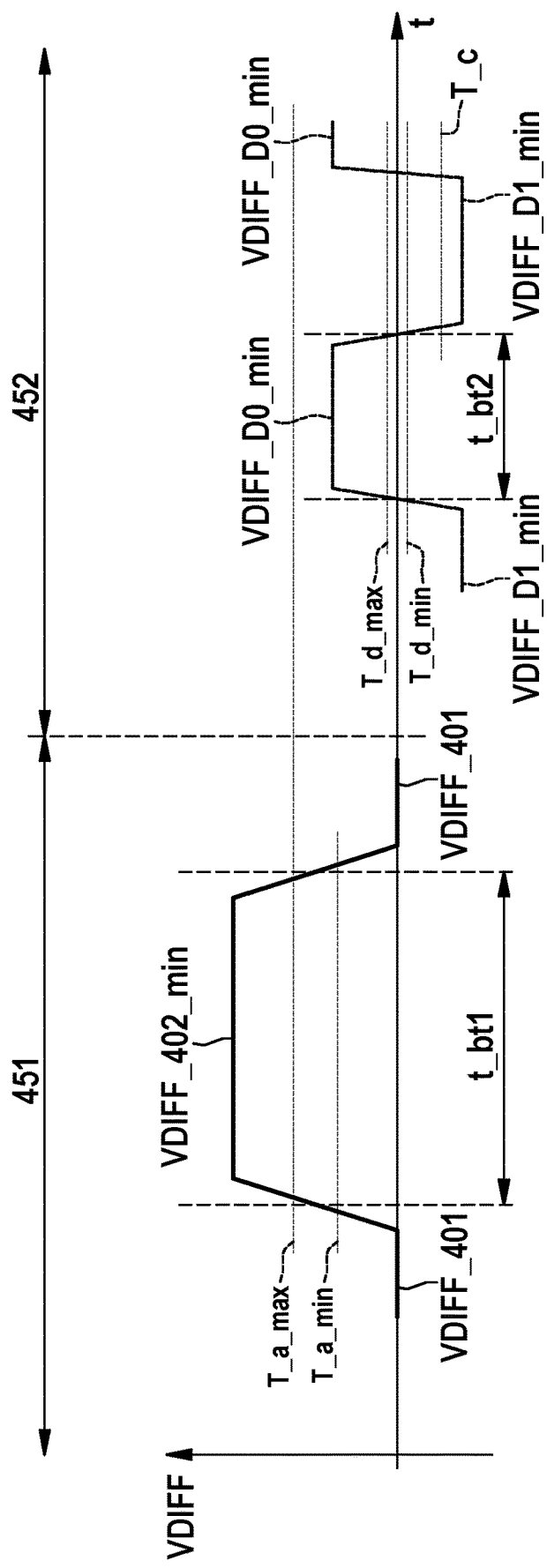
FIG. 8 shows a temporal profile of a differential voltage VDIFF that results due to bus signals CAN XL_H and CAN XL_L, in each case for a detail from the arbitration phase and from the data phase, according to the first exemplary embodiment of the present invention.

In general, according to FIG. 8, in communication phases 451, 453 for the receiver of frame 450, a differential voltage VDIFF between a maximum of 0.05 V=VDIFF_401_max for recessive states 401 and at least 1.5 V=VDIFF_402_min for dominant states 402 results. In addition, according to FIG. 8, reception threshold T_a of reception block 122 is generally between a minimum reception threshold T_a_min of 0.5 V and a maximum reception threshold T_a_max of 0.9 V in switching block 152. The value of reception threshold T_a depends on manufacturing tolerances as well as the effect of temperature and operating voltage. Thus, when differential voltage VDIFF is below 0.5 V, as shown in the left portion of FIG. 8 as an example, bus level VDIFF_401 is reliably read as "recessive." If the level of differential voltage VDIFF is above 0.9 V, the bus level is reliably read as "dominant." If the level of differential voltage VDIFF is between 0.5 V and 0.9 V, the level cannot be reliably detected as "recessive" or "dominant."

If transceiver device 12, in particular its device 15, detects the end of arbitration phase 451, for user stations 10, 20, 30 of bus system 1, transceiver device 12, 22, 32 is switched over into the corresponding operating mode for data phase 452, as explained in greater detail below with reference to FIG. 9.

The right portion of FIG. 8 shows differential voltage VDIFF, which forms from signals data_0 and data_1, which transmission block 121 transmits onto bus 40 in the operating mode of data phase 452. In the example from FIGS. 6 through 8, the bus levels on bus 40 for the data 0 states are approximately 3 V for signal CAN XL_H, and 2 V for signal CAN XL_L. Bus levels U_D1 on bus 40 for the data 1 states in data phase 452 are approximately 2 V for signal CAN XL_H, and 3 V for signal CAN XL_L. A differential voltage VDIFF of +/−1 V would also be possible with other bus levels. However, the levels of 3 V and 2 V according to FIG. 6 are symmetrical with respect to the mean voltage of 2.5 V for an operating voltage of 5 V. The symmetry is advantageous for reducing irradiations, which impair the quality of the signals on bus 40.

According to the right portion of FIG. 8, in optionally faster data phase 452 for bus states data_0, data_1, bus states U_D0, U_D1 or differential voltages VDIFF_D0, VDIFF_D1, corresponding to the binary data states 0 and 1 of transmission signal TXD, result. Minimum differential voltage VDIFF_D0 min for data 0 bits, expected by the receiver in data phase 452, is approximately 0.6 V in the example from FIGS. 6 through 8. Maximum differential voltage VDIFF_D1 max for data 1 bits in data phase 452 is approximately −0.6 V in the example from FIGS. 6 through 8.

For this purpose, transmission block 121 once again drives the states of differential signals CAN XL_H, CAN XL_L differently, as in above-mentioned communication phases 451, 453. However, in data phase 452 the two bus states U_D0, U_D1 or differential voltages VDIFF_D0, VDIFF_D1 are driven symmetrically, corresponding to data states 0 and 1 of transmission signal TXD. In addition, the bus levels for data states data_0 in communication phases 451, 453 are different from data states data_0 in communication phase 452. Furthermore, the bus levels for data states data_1 in communication phases 451, 453 are different from data states data_1 in communication phase 452.

In data phase 452, in addition to reception threshold T_a of phases 451, 453, reception block 122 uses a reception threshold T_d, which is nominally approximately 0.0 V and therefore between the maximum value of T_d_max=0.1 V and the minimum value of T_d_min=−0.1 V. The value of reception threshold T_d depends on manufacturing tolerances as well as the effect of temperature and operating voltage.

Nominal differential voltage VDIFF_401 for the recessive data state, at 0 V, is in the range between T_d_max and T_d_min, and therefore cannot be unequivocally detected when reception threshold T_d is used. However, nominal differential voltage VDIFF_401 for the recessive data state may be detected using reception threshold T_a. Minimum differential voltage VDIFF_D0 min for data state data_0 is below T_a_max, and therefore cannot be unequivocally detected when reception threshold T_a is used. However, minimum differential voltage VDIFF_D0 min for data state data_0 may be detected using reception threshold T_d.

Furthermore, in data phase 452, reception block 122 may additionally use a reception threshold T_c, which is approximately −0.4 V. For this purpose, for reception block 122, operating mode adjustment device 15 sets reception threshold T_a, thus far used only in phases 451, 453, and reception threshold T_d, thus far used only in phase 452, to the three reception thresholds T_a, T_d, T_c, or connects one of reception thresholds T_a, T_d to reception threshold T_c as a function of an evaluation, as described in greater detail with reference to FIG. 9.

Even if the numerical value of reception threshold T_c is −0.4 V, for example, the numerical value may be optimized, depending on the CAN bus topology being presently used.

Transmission block 121 is thus switched over from a first operating mode in phases 451, 453 into some other operating mode in data phase 452, as explained in greater detail with reference to FIG. 9. In the first operating mode, the bits have a bit time duration t_bt1, and there are dominant and recessive bus states or bus levels. In one operating mode of data phase 452, the bits have a bit time duration t_bt2, and there are no dominant and recessive bus states or bus levels, but, rather, bus levels data_0 and data_1. Bit time duration t_bt2 may be shorter than bit time duration t_bt1, as shown in FIG. 6. Bit time durations t_bt2, t_bt1 are optionally equal.

In other words, in a first operating mode according to FIG. 4, FIG. 5, and the left portion of FIG. 6, transmission block 121 generates a first data state, for example 0, of transmission signal TxD as bus state 402 with different bus levels for two bus lines 41, 42 of bus 40, and a second data state, for example 1, of transmission signal TxD as bus state 401 with the same bus level for the two bus lines 41, 42 of bus 40.

In addition, for the temporal profiles of signals CAN XL_H, CAN XL_L in an operating mode that includes data phase 452, transmission block 121 in each case drives first and second data states 0, 1 of transmission signal TxD at least in part, so that bus levels data_0, data_1 of the right portion of FIG. 6 form for the two bus lines 41, 42 of bus 40.

The difference between the physical layer of CAN in communication phases 453, 451 and the above-described physical layer in data phase 452 is that states data_1 having differential voltage VDIFF_D1 in data phase 452 are partially or completely driven by transmission block 121 or transceiver device 12. For a bit rate of 10 Mbit/s, for example, in data phase 452, a bit time t_bt2=100 ns.

Thus, in the shown example from FIG. 6, bit time duration t_bt2 in data phase 452 is shorter than bit time duration t_bt1 that is used in arbitration phase 451 and frame end phase 453. Therefore, transmission is carried out with a higher bit rate in data phase 452 than in arbitration phase 451 and frame end phase 453. In this way, the transfer speed in bus system 1 may be increased even more than with CAN FD.

Figure 9:
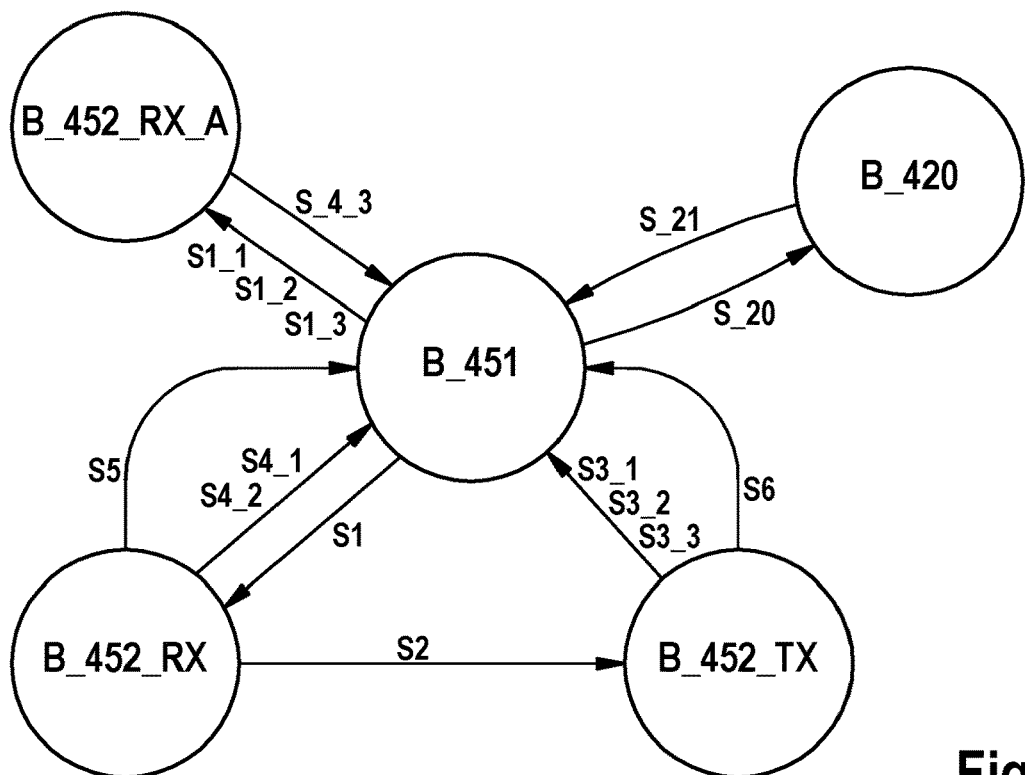
FIG. 9 shows a state diagram for the operating states of the transceiver device according to the first exemplary embodiment of the present invention.

FIG. 9 illustrates in a diagram the switchover of reception block 122 between communication phases 451, 453, in which a slow operating mode B_451 or "slow mode" is optionally used, and communication phase 452, in which a fast operating mode or "fast mode" is used, as explained in greater detail below. In addition, transceiver device 12 may be switched into a configuration operating mode B_420, as illustrated via a switching condition S20 at an arrow between operating mode B_451 and operating mode B_420.

In configuration operating mode B_420 at least one setting may be made for the communication, for example setting the numerical values for reception thresholds T_a, T_d, T_c, setting the numerical values for time periods in which communication in bus system 1 is used, setting at least one identifier, or other settings. Switchback condition S21 from operating mode B_420 into operating mode B_451 may be that transmission signal TxD is constant for a predetermined time t of greater than 5 μs, for example, as illustrated via a switchback condition S21 at the arrow between operating modes B_420, B_451. As the result of switchback condition S21, user station 10 may once again reliably take part in the communication in bus system 1 after predetermined time t.

In communication phase 452, for transceiver device 12, more precisely its reception block 122, there are three different operating modes, namely, operating mode B_452_RX, operating mode B_452_TX, and operating mode B_452_RX_A. The operating mode is provided only for a user station 10, 20, 30 that does not know in which phase CAN bus 40 is presently being operated and that would like to integrate into the communication. This is described in greater detail below.

Operating mode adjustment device 15, more precisely its evaluation block 151, may be used for detecting that a switch is to be made between operating modes 451, 452_RX, 452_TX, 452_RX_A, as illustrated in FIG. 9. Evaluation block 151 may be designed as a comparator. It is meaningful to subject the measuring result of evaluation block 151 to low pass filtering, so that the switchover with the aid of block 152 of operating mode adjustment device 15 is not erroneously triggered by overshootings or reflections.

Reception threshold switching block 152 is designed to decide, as a function of the evaluation result of evaluation block 151, into which of operating modes 451, 452_RX, 452_TX, 452_RX_A reception block 122 is to be switched.

Reception threshold switching block 152 switches from operating mode B_451 into operating mode B_452_RX when, during normal operation of user station 10, the end of arbitration phase 451 for a CAN XL frame 450 has been detected when user station 10 has not won the arbitration. In this case, transceiver device 12 is able to act only as a receiver in subsequent data phase 452. Alternatively, in subsequent data phase 452 in operating mode B_452_TX, transceiver device 12 acts both as a sender and a receiver of a frame 450 when user station 10 has won the arbitration.

As a result, regardless of whether user station 10 has lost or won the arbitration, transceiver device 12, in particular reception block 122, is switched over from operating mode B_451, in which signals according to FIG. 4 or the left portion of FIG. 6 are generated, into operating mode B_452_RX for data phase 452. User station 10 thus changes from operating mode B_451 into operating mode B_452_RX, as illustrated by arrow S1 in FIG. 9. Consequently, reception threshold switching block 152 switches on reception threshold T_d instead of reception threshold T_a, as already mentioned with reference to FIGS. 4 through 6. If user station 10 has lost the arbitration, transmission block 121 is also deactivated or locked, so that no signals are transmitted onto bus 40 due to the fact that user station 10 acts only as a receiver of frame 450.

If user station 10 has won, not lost, the arbitration, transceiver device 12, in particular transmission block 121, is further switched over from operating mode B_452_RX for data phase 452 into operating mode B_452_TX. User station 10 thus changes from operating mode B_452_RX into operating mode B_452_TX, as illustrated by arrow S2 in FIG. 9. Thus, transmission block 121 transmits signals according to the right portion of FIG. 6 onto bus 40. In addition, reception block 122 receives the signals from bus 40, the same as in operating mode B_452_RX and mentioned above.

Reception threshold switching block 152 switches from operating mode B_452_TX back into operating mode B_451 when one of the following three cases is present, as illustrated via switchback conditions S3_1, S3_2, S3_3 at the arrow between operating modes B_452_TX, B_451.

Switchback condition S3_1 is present when user station 10, for example evaluation block 151, in operating mode B_452_TX detects that data phase 452 is ended.

Switchback condition S3_2 is present when reception signal RxD contains an excessively long sequence of identical bits; for example, an error frame 47 has been received, or erroneously no stuff bit has been inserted into frame 450.

Switchback condition S3_3 is present when transceiver device 12 detects that at least one other of user stations 20, 30 has transmitted something onto bus 40 during data phase 452, so that there is no longer exclusive, collision-free access to bus 40, and a collision occurs on bus 40.

In addition, reception threshold switching block 152 switches from operating mode B_452_RX back into operating mode B_451 when one of the following two cases is present, as illustrated via switchback conditions S4_1, S4_2 at the arrow between operating modes B_452_RX, B_451.

Switchback condition S4_1 is present when user station 10, for example evaluation block 151, in operating mode B_452_RX detects that data phase 452 is ended.

Switchback condition S4_2 is present when transmission block 121, after data phase 452 has ended, once again transmits something onto bus 40 due to the fact that user station 10 wants to take part in the next arbitration in order for user station 10 itself to transmit a frame 450 onto bus 40.

For the sake of security, reception threshold switching block 152 also switches from operating mode B_452_RX back into operating mode B_451 when transmission block 121 transmits something onto bus 40 during ongoing data phase 452. This is illustrated via a switchback condition S5 at the arrow between operating modes B_452_RX, B_451. In operating mode B_452_RX, transmission block 121 generally transmits something onto bus 40 only when an error has been detected, so that transmission block 121 transmits an error frame 47 onto bus 40. Switchback condition S5 represents a security measure so that the communication in bus system 1 may be securely restarted from first operating mode B_451.

For the sake of security, reception threshold switching block 152 also switches from operating mode B_452_TX back into operating mode B_451 when transmission signal TxD is constant for a predetermined time t of greater than 5 µs, for example, as illustrated via a switchback condition S6 at the arrow between operating modes B_452_TX, B_451. Switchback condition S6 represents a security measure for making the communication in bus system 1 robust against error states.

In addition, reception threshold switching block 152 is designed to switch over from operating mode B_451 into operating mode B_452_RX_A, for example when one of the following three switch-on conditions S1_1, S1_2, S1_3 is present, as illustrated in FIG. 9 at the arrow between operating modes B_451, B_452_RX_A. Operating mode B_452_RX_A may also be referred to as "auto fast RX" mode.

Switch-on condition S1_1 is present when user station 10 is switched on and must integrate into an ongoing bus communication.

Switch-on condition S1_2 is present when user station 10 is switched into the protocol exception state.

Switch-on condition S1_3 is present when a user station 10, 30 has lost the synchronization with a transmitting user station 10, 30.

In operating mode B_452_RX_A, reception threshold switching block 152 switches over between reception threshold T_a of "slow" operating mode B_451 and reception threshold T_d of "fast RX" operating mode B_452_RX, using reception threshold T_c, as described below.

In operating mode B_452_RX_A, transceiver device 12 initially operates using reception threshold T_a of slow operating mode B_451 and reception threshold T_c. As soon as reception threshold T_c is undershot, transceiver device 12, more precisely its block 152, switches reception threshold T_a over to reception threshold T_d of fast RX operating mode B_452_RX for a predetermined time period t_A (tAuto_Mode). After predetermined time period t_A has elapsed, transceiver device 12, more precisely its block 152, switches over reception threshold T_d back to reception threshold T_a of slow operating mode B_451. Time period t_A in configuration operating mode B_420, for example, is set in such a way that transceiver device 12 in predetermined time period t_A, in which transceiver device 12 operates using reception threshold T_d of fast RX operating mode B_452_RX, passes on at least one stuff bit to communication control device 11. In this way, the situation is avoided that idle state 410 is erroneously detected during data phase 452 of a CAN XL frame 450. Transceiver device 12 may switch over multiple times during data phase 452 of a CAN XL frame 450, as described above.

Reception threshold switching block 152 thus switches from operating mode B_452_RX_A back into operating mode B_451 when reception threshold T_c is not undershot for predetermined time period t_A, as illustrated via a switchback condition S4_3 at the arrow between operating modes B_452_RX_A, B_451. The switchback takes place when data phase 452 is ended and therefore data_1 levels are no longer being driven onto bus 40.

The automatic switchback to reception threshold T_a of slow operating mode B_451 ensures that an idle state 410 is reliably detected after data phase 452.

After idle state 410 is detected, communication control device 11 is integrated into the bus communication, and switches transceiver device 12 from auto fast RX mode or operating mode B_452_RX_A into the slow operating mode or operating mode B_451.

Switchback condition S4_3 represents a measure for enabling user station 10 to integrate into the bus communication. In operating mode B_452_RX_A, user station 10 by use of reception threshold T_c may avoid erroneously detecting idle state 410 when user station 10, for example after the switch-on, cannot yet know in which operating mode B_451, B_452_RX, B_452_TX the other transceiver devices 22, 32 in bus system 1 are operating.

This prevents user station 10, which for the integration switches its transceiver device 12 into the slow mode or operating mode B_451, from ending the integration too early, since user station 10 cannot reliably detect the data 0 bits of an ongoing CAN XL frame 450. If user station 10 ends the integration too early, user station 10 may disrupt the communication.

In addition, user station 10, which for the integration switches its transceiver device 12 into the fast mode or operating mode B_452_RX, is prevented from ending the integration too late or not at all when user station 10 cannot detect all recessive bits 401 of an idle CAN bus 40. If user station 10 never ends the integration, user station 10 cannot take part in the communication.

Figure 10:
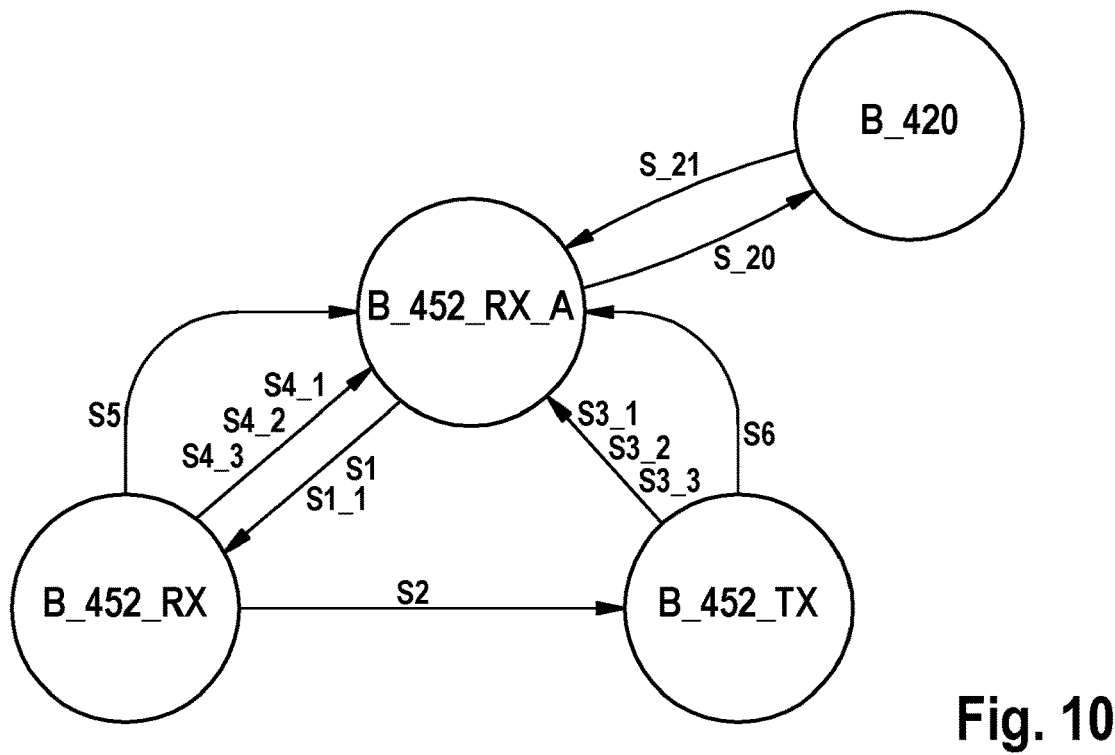
FIG. 10 shows a state diagram for the operating states of the transceiver device according to a second exemplary embodiment of the present invention.

FIG. 10 shows a state diagram illustrating one embodiment of operating mode adjustment device 15 and reception block 122 or transceiver device 12 according to a second exemplary embodiment. Except for the differences described below, operating mode adjustment device 15 and reception block 122 or transceiver device 12 according to the present exemplary embodiment have the same design as operating mode adjustment device 15 and reception block 122 or transceiver device 12 according to the preceding exemplary embodiment.

In contrast to the preceding exemplary embodiment, operating mode adjustment device 15 replaces the slow mode or operating mode B_451 by the auto fast RX mode or operating mode B_452_RX_A, as illustrated in FIG. 10. Thus, user station 10 uses the auto fast RX mode or operating mode B_452_RX_A not only for the integration, as described above with reference to FIG. 9, but also during the normal communication.

In this case, in the present exemplary embodiment a second predetermined time t_A_10 ((tAuto_Off) is specified in operating mode adjustment device 15, in particular its reception threshold switching block 152, in which the automatic switchover of reception thresholds T_d, T_c is switched off. The automatic switchover is then switched off, for example for time t_A_10 (tAuto_Off), after communication control device 11, more precisely its protocol controller, has adjusted the operating mode or after the TxD input of transceiver device 12 has been set to "0" by communication control device 11.

In this way, a user station 10, 30 that cannot detect the length of a received CAN XL frame 450, for example due to an error in the header check sum (header CRC error), may wait for the re-integration pattern at the end of a CAN XL frame 450 without erroneously detecting idle state 410 beforehand.

User stations 10, 30 may thus re-integrate after errors without using conventional CAN error frames (error flags) 47. This is very advantageous, since an ongoing communication is not thereby disturbed and interrupted. As a result, the net data rates in bus system 1 may be further increased.

All of the above-described embodiments of devices 15, 35, of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 100Base-T1 Ethernet, field bus systems, etc.

In particular, bus system 1 according to the exemplary embodiments may be a communications network in which data are serially transferrable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or more of user stations 10 or 30 to be present in bus system 1. It is possible for all user stations in bus system 1 to have the same design, i.e., for only user station 10 or only user station 30 to be present.

The number of reception thresholds T_c which are to be switched on in addition to reception threshold T_d or T_a may also be increased even further than described above. The plausibility check of the detection of the present operating mode of the ongoing communication may thus be even further improved. However, the complexity of evaluating the thresholds increases with the number of reception thresholds T_c that are connected.

All variants described above for detecting the operating mode may be subjected to temporal filtering to increase the robustness with regard to electromagnetic compatibility (EMC) and electrostatic discharge (ESD), pulses, and other disturbances.

What is claimed is:

1. A device of a user station, which is one of a plurality of user stations of a serial bus system, comprising:
   circuitry coupled to lines of a bus of the bus system, by which a signal is receivable from the bus of the bus system, the signal being based on a transmission signal via which a message is exchanged between the user stations of the bus system; and
   a processor, wherein the processor is configured to:
      in a first communication phase in which in the signal different values are provided by a recessive bus state and a dominant bus state, interpret the received signal using a first reception threshold; and in a second communication phase in which in the signal different values are provided without the recessive bus state, interpret the received signal using a second reception threshold; and responsive to a connection of the user station to the bus system being initiated after others of the user stations have been communicating via the bus system without recognition by the user station of which of the first and second communication phases is currently active on the bus system:

begin operation of the user station according to the second communication phase; and switch operation of the user station from the second communication phase, in which the second reception threshold is used, into the first communication phase, in which the first reception threshold is used, upon detection of a level of the signal being above a third reception threshold for a predefined amount of time, the third reception threshold being different than the first and second thresholds.

2. A device of a user station, which is one of a plurality of user stations of a serial bus system, the device comprising:

circuitry coupled to lines of a bus of the bus system, by which a signal is receivable from the bus of the bus system, the signal being based on a transmission signal via which a message is exchanged between the user stations of the bus system; and a processor, wherein:

the processor is configured to:

in a first communication phase in which, in the signal, a recessive bus state is overwritable by a dominant bus state, interpret the received signal using a first reception threshold;

in a second communication phase in which bus states other than the recessive and the dominant bus states are present in the signal, interpret the receives signal using a second reception threshold;

evaluate the signal from the bus of the bus system using a switchover reception threshold that differs from the first reception threshold and the second reception threshold; and perform a time-limited switchover of the user station from a mode in which the first reception threshold is used to a mode in which the second reception threshold is used in response to detection of presence of a predefined bus level of the transmission signal using the switchover reception threshold; and for the time-limited switchover of the reception threshold from the first reception threshold to the second reception threshold, switch the user station into an operating mode that differs from three other operating modes of the device, and wherein the three other operating modes of the device include:

a first operating mode for transmitting and/or receiving the signal in the first communication phase, a second operating mode only for receiving the signal in the second communication phase, and a third operating mode for transmitting and receiving the signal in the second communication phase.

3. The device as recited in claim 1, wherein the circuitry obtains respective line signals from different two of the lines of the bus, the signal being formed by a difference between the two line signals, and wherein the processor is configured to compare the signal to one or more of the reception thresholds.

4. The device as recited in claim 1, wherein the processor is configured to switch the user station into the second communication phase in response to the third reception threshold being undershot.

5. The device as recited in claim 4, wherein the third reception threshold has a negative numerical value.

6. The device as recited in claim 1, wherein bus states of the signal received from the bus in the first communication phase are generated with a different physical layer than bus states of the signal received from the bus in the second communication phase.

7. The device as recited in claim 1, wherein bus states of the signal received from the bus in the first communication phase have a longer bit time than bus states of the signal received in the second communication phase.

8. The device as recited in claim 1, wherein in the first communication phase, it is negotiated which of the user stations of the bus system in a subsequent second communication phase obtains, at least temporarily, exclusive, collision-free access to the bus.

9. The device as recited in claim 1, wherein the circuitry is configured to transmit messages onto the bus of the bus system, with the processor being configured to switch the user station, for the transmission, between a transmission operating mode for the first communication phase and a transmission operating mode for the second communication phase.

10. A user station for a serial bus system, the user station comprising:

a device for control of communication of the user station with other user stations of the bus system, the device including:

circuitry coupled to lines of a bus of the bus system, by which a signal is receivable from the bus of the bus system, the signal being based on a transmission signal via which a message is exchanged between the user stations of the bus system; and a processor, wherein the processor is configured to:

in a first communication phase in which in the signal different values are provided by a recessive bus state and a dominant bus state, interpret the received signal using a first reception threshold; and in a second communication phase in which in the signal different values are provided without the recessive bus state, interpret the received signal using a second reception threshold; and responsive to a connection of the user station to the bus system being initiated after others of the user stations have been communicating via the bus system without recognition by the user station of which of the first and second communication phases is currently active on the bus system:

begin operation of the user station according to the second communication phase; and switch operation of the user station from the second communication phase, in which the second reception threshold is used, into the first communication phase, in which the first reception threshold is used, upon detection of a level of the signal being above a third reception threshold for a predefined amount of time, the third reception threshold being different than the first and second thresholds.

11. The user station as recited in claim 10, wherein the processor is configured to switch the user station into the first communication phase when the processor detects an idle state on the bus.

12. A bus system, comprising:
a bus; and
a plurality of user stations that are connected to one another via the bus in such a way that they may communicate serially with one another, a first one of the user stations including:
a device for control of communication of the first user station with other user stations of the bus system, the device including:
circuitry coupled to lines of a bus of the bus system, by which a signal is receivable from the bus of the bus system, the signal being based on a transmission signal via which a message is exchanged between the user stations of the bus system; and
a processor, wherein the processor is configured to:
in a first communication phase in which in the signal different values are provided by a recessive bus state and a dominant bus state, interpret the received signal using a first reception threshold; and
in a second communication phase in which in the signal different values are provided without the recessive bus state, interpret the received signal using a second reception threshold; and
responsive to a connection of the first user station to the bus system being initiated after others of the user stations have been communicating via the bus system without recognition by the first user station of which of the first and second communication phases is currently active on the bus system:
begin operation of the first user station according to the second communication phase; and
switch operation of the first user station from the second communication phase, in which the second reception threshold is used, into the first communication phase, in which the first reception threshold is used, upon detection of a level of the signal being above a third reception threshold for a predefined amount of time, the third reception threshold being different than the first and second thresholds.

13. A method of a user station of a plurality of user stations that communicate in a serial bus system, wherein a signal is receivable by the user station from a bus of the bus system, the signal being based on a transmission signal via which a message is exchanged between user stations of the bus system, and wherein the user station is configured to (a) in a first communication phase in which, in the signal, different values are provided by a recessive bus state and a dominant bus state, interpret the receives signal using a first reception threshold, and (b) in a second communication phase in which, in the signal, different values are provided without the recessive bus state, interpret the received signal using a second reception threshold, the method comprising:
responsive to a connection of the user station to the bus system being initiated after others of the user stations have been communicating via the bus system without recognition by the user station of which of the first and second communication phases is currently active on the bus system:
beginning operation of the user station according to the second communication phase; and
switching operation of the user station from the second communication phase, in which the second reception threshold is used, into the first communication phase, in which the first reception threshold is used, upon detection of a level of the signal being above a third reception threshold for a predefined amount of time, the third reception threshold being different than the first and second thresholds.

\* \* \* \* \*